United States Patent
DeBoer et al.

(10) Patent No.: US 8,872,480 B2
(45) Date of Patent: Oct. 28, 2014

(54) CURRENT MONITORING AND LIMITING APPARATUS, SYSTEM AND METHOD FOR ELECTRIC VEHICLE SUPPLY EQUIPMENT

(75) Inventors: John DeBoer, Denver, CO (US); Brian Timothy McCoy, Lawrenceville, GA (US); Drew Stephen Hancock, Sugar Hill, GA (US); Harry Price Haas, Atlanta, GA (US); Scott Clayton Turner, Lilburn, GA (US)

(73) Assignee: Siemens Industry, Inc., Alpharetta, GA (US)

( * ) Notice: Subject to any disclaimer, the term of this patent is extended or adjusted under 35 U.S.C. 154(b) by 481 days.

(21) Appl. No.: 13/308,984

(22) Filed: Dec. 1, 2011

(65) Prior Publication Data

US 2013/0141040 A1    Jun. 6, 2013

(51) Int. Cl.
*H01M 10/44* (2006.01)
*H01M 10/46* (2006.01)

(52) U.S. Cl.
USPC .......................................... 320/134; 320/136

(58) Field of Classification Search
USPC ......... 320/104, 107, 109, 116, 119, 134, 136; 361/78, 79, 88
See application file for complete search history.

(56) References Cited

U.S. PATENT DOCUMENTS

| | | | |
|---|---|---|---|
| 2004/0169489 A1* | 9/2004 | Hobbs | 320/104 |
| 2008/0218121 A1 | 9/2008 | Degner | |
| 2011/0029144 A1 | 2/2011 | Miller | |
| 2011/0037429 A1 | 2/2011 | Cowans | |
| 2011/0074350 A1* | 3/2011 | Kocher | 320/109 |
| 2011/0148353 A1* | 6/2011 | King et al. | 320/109 |
| 2011/0221393 A1 | 9/2011 | Billmaier | |
| 2011/0316482 A1* | 12/2011 | Baxter et al. | 320/109 |

FOREIGN PATENT DOCUMENTS

WO    2011019509 A1    2/2011

OTHER PUBLICATIONS

PCT International Search Report mailed Sep. 23, 2013 corresponding to PCT International Application No. PCT/US2012/067249 filed Nov. 30, 2012 (9 pages).

* cited by examiner

*Primary Examiner* — Edward Tso

(57) ABSTRACT

An electric vehicle charging system is disclosed. More particularly, the system encompasses a load center having one or more electrical loads coupled thereto, electric vehicle supply equipment (EVSE) to charge an electric vehicle (EV), and a monitoring and limiting device (MLD) to monitor power or current usage of at least the one or more loads coupled to the load center, and adjust a charging level setting of the EVSE based upon the level of the usage. MLD apparatus and methods of charging a vehicle with electric vehicle supply equipment (EVSE) are provided, as are other aspects.

21 Claims, 8 Drawing Sheets

US 8,872,480 B2

CURRENT MONITORING AND LIMITING APPARATUS, SYSTEM AND METHOD FOR ELECTRIC VEHICLE SUPPLY EQUIPMENT

FIELD OF THE INVENTION

The present invention relates generally to apparatus, systems and methods adapted to electrically charge electric vehicles.

BACKGROUND INFORMATION

With the advent of high fuel prices, the automotive industry has reacted with a selection of Electric Vehicles (EVs). Such EVs are propelled by an electric motor (or motors) that are powered by rechargeable power sources (e.g., battery packs). EVs include both full electric and hybrid electric vehicles. Electric motors have several advantages over internal combustion engines. For example, electric motors may convert about 75% of the chemical energy from the batteries to power the wheels, whereas internal combustion engines (ICES) may only convert only about 20% of the energy stored in gasoline. EVs emit no tailpipe pollutants when operating in battery mode, although the power plant producing the electricity may emit them. Electric motors provide quiet, smooth operation, strong acceleration and require relatively low maintenance. However, most EVs can only go about 100-200 miles before requiring recharging. Fully recharging an EV's battery pack may take about 4 to 8 hours. Even a quick charge to about 80% capacity can take about 30 minutes. Furthermore, as battery pack size increases, so does the corresponding charging time. EV charging may take place at the owner's residence using an electric vehicle recharging station, referred to herein as an electric vehicle supply equipment (EVSE).

Such EVSEs are typically installed at the residence (e.g., in a garage), and are electrically coupled to the electrical load center for the residence. For example, the EVSE may be coupled by an electrical conduit to a branch circuit breaker of the load center by either being wired directly or plugged into a wall socket. During such EV charging events, the current draw may be quite substantial. In such cases where other residential electric components are also being operated (e.g., aft conditioning units, hot water heaters, fans, lighting, electric stoves, electric dryers, motors, etc.) the overall power consumption requirements may, in some instances, exceed the maximum amperage rating of the utility service to the residence. Such electrical utility services typically have maximum ratings that range from about 60 A-200 A. In such overdraw situations where the maximum rating is exceeded, a main breaker protecting the load center may be actuated (e.g., tripped) to protect the residence from a possible over-current situation.

Therefore, there is a need for improvements to systems, such as residential electrical systems including load centers having EVSEs electrically connected to them.

SUMMARY

According to a first aspect, an electric vehicle charging monitoring and limiting device is provided. The electric vehicle charging monitoring and limiting device includes a monitoring and limiting device (MLD) adapted to monitor power or current usage of the one or more electrical loads coupled to a load center, and send a signal to adjust a charging level setting of electric vehicle supply equipment (EVSE) based upon a level of the usage.

According to another aspect, an electric vehicle charging system is provided. The system includes a load center having one or more electrical loads coupled thereto, electric vehicle supply equipment (EVSE) adapted to supply an electrical current to charge an electric vehicle (EV), and a monitoring and limiting device (MLD) adapted to monitor power or current usage of the one or more loads coupled to the load center and adjust a charging level setting of the EVSE based upon a level of the usage.

According to another aspect, an improved electric vehicle charging system is provided. The system includes a load center adapted and configured to have one or more electrical loads coupled thereto, and a monitoring and limiting device (MLD) adapted to monitor current usage of at least one of the one or more electrical loads coupled to the load center, the MLD adapted to communicate with an EVSE, the MLD further including a maximum amperage set switch operable to set a maximum amperage rating corresponding to the load center, and an MLD communication module adapted to send a signal to adjust a charging level setting of the EVSE based upon the monitored current usage.

According to another aspect, a circuit breaker is provided. The circuit breaker includes at least two mechanical poles; and a monitoring and limiting device (MLD) adapted to monitor power or current usage of the one or more electrical loads coupled to a load center, and send a signal to adjust a charging level setting (Ac) of electric vehicle supply equipment (EVSE) based upon a level of the usage, wherein the MLD is integrated between the two mechanical poles.

According to yet another aspect, an improved method of charging a vehicle with electric vehicle supply equipment is provided. The method includes providing an electrical load center having one or more electrical loads coupled thereto, providing electric vehicle supply equipment (EVSE) adapted to supply an electrical current to charge an electric vehicle (EV), the EVSE electrically coupled to the load center, monitoring usage of one or more of the electrical loads coupled to the electrical load center, and adjusting a charging level setting of the EVSE based on the monitored usage.

Still other aspects, features, and advantages of the present invention may be readily apparent from the following detailed description by illustrating a number of exemplary embodiments and implementations, including the best mode contemplated for carrying out the present invention. The present invention may also be capable of other and different embodiments, and its several details may be modified in various respects, all without departing from the spirit and scope of the present invention. Accordingly, the drawings and descriptions are to be regarded as illustrative in nature, and not as restrictive. The drawings are not necessarily drawn to scale. The invention covers all modifications, equivalents, and alternatives falling within the spirit and scope of the invention.

DETAILED DESCRIPTION

Reference will now be made in detail to the exemplary embodiments of this disclosure, examples of which are illustrated in the accompanying drawings. Wherever possible, the same reference numbers will be used throughout the drawings to refer to the same or like parts. The drawings are not necessarily drawn to scale.

The aforementioned problems of Electric Vehicle Service Equipment are overcome by the present invention. In particular, exceeding a maximum amperage rating of the electrical service is avoided, thereby minimizing or eliminating instances where a main breaker of the load center may be actuated (e.g., tripped) to protect the residence from possible over-current situations because the circuit branch containing the EVSE draws too much current when other electrical components are also being powered. Such a system can operate the EVSE effectively while reducing the risk of actuating the main circuit breaker protecting the load center. Furthermore, the present invention may make it possible to operate the EVSE without replacing the aforementioned load center with a larger load center and possibly higher amperage utility service.

In particular, the inventive device and system includes a Monitoring and Limiting Device (MLD) that functions to monitor power or current usage of one or more electrical loads coupled to an electrical load center, and then adjusts a charging level output setting (Ac) of an EVSE that is coupled to the load center. Accordingly, situations where too much current is drawn when other branch circuit(s) coupled to the load center are also drawing current are avoided. As such, the invention reduces or eliminates instances where charging an EV using the EVSE causes tripping of a main circuit breaker. In some embodiments, the MLD may communicate wirelessly and directly with the EVSE using any suitable wireless communication protocol. For example a ZIGBEE wireless communication protocol may be used. ZIGBEE is a specification for a suite of high level communication protocols using small, low-power digital radios based on an IEEE 802 standard for personal area networks. ZIGBEE utilizes short-range wireless radio-frequency (RF) transfer of data at relatively low rates. Other suitable wireless communication protocols such as Wi-Fi may be used. Optionally, wired communication or a power line communication protocol may be used. Methods of operating the system are also described. The invention will be explained in greater detail with reference to FIGS. 1-7 below.

Figure 1:
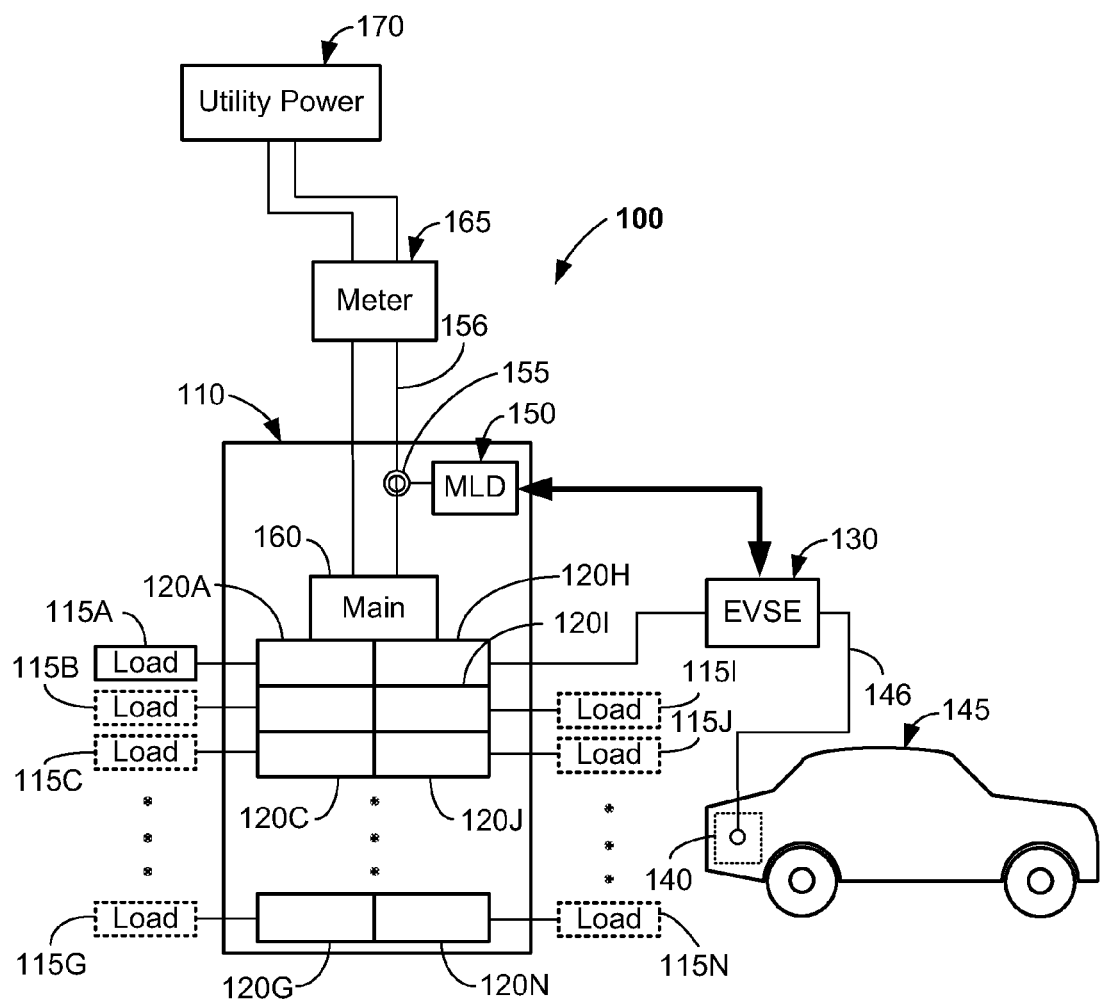
FIG. 1 illustrates a schematic diagram of an electric vehicle charging system according to embodiments.

FIG. 1 illustrates an embodiment of an electric vehicle charging system 100. The electric vehicle charging system 100 includes a load center 110 having one or more electrical loads 115A-115N coupled thereto. The electrical loads 115A-115N may be part of any branch electric circuit. The electrical loads 115A-115N may be any current-drawing electric article, such as air conditioning units, fans, refrigerators, stoves, etc. The number of loads 115-115N may be as many as allowed by the load center 110, and any subpanel electrically coupled thereto. Each electrical load 115A-115N may be protected by its own circuit breaker 120A-120H. Such circuit breakers may have amperage ratings of between about 10 A and about 125 A, for example. One of the electrical circuit branches includes an electrical load which is electric vehicle supply equipment (EVSE) 130.

In the depicted embodiment, the electric vehicle supply equipment (EVSE) 130 is electrically connected to circuit breaker 120H. As discussed above, the EVSE 130 is a device that is adapted to supply an electrical current output to charge an electrical power source 140 (e.g., a battery pack) of an electric vehicle (EV) 145. The power may be supplied to the EV 145 by a charging cable 146 having a connector electrically coupling the EVSE 130 to a receiving connector on the EV 145. The EVSE 130 may be wired directly to a circuit breaker 120H, plugged into a wall socket electrically coupled to the circuit breaker 120H.

The system 100 includes a monitoring and limiting device (MLD) 150 that is adapted to monitor power or current usage of the one or more electrical loads 115A-115N. In the depicted embodiment, the MLD 150 monitors the electrical loads 115A-115C and 115I-115N as well as the electrical load drawn by the EVSE 130 coupled to the load center 110. The MLD 150 operates to adjust a charging level output setting of the EVSE 130 based upon a level of the usage of current or power of one or more of the electrical loads. In particular, a charge level setting is communicated (e.g., wirelessly) from the MLD 150 to the EVSE 130, which is then sent to the EV 145 via the established protocol to set the resultant charge level.

In one embodiment, a sensor 155 of the MLD 150 monitors a current drawn by all the electrical loads 115A-115N, including the current drawn by the EVSE 130. The sensor 155 may be provided at any convenient location in the system 100. For example, the sensor 155 may be provided at a location where the current supplied by the utility service to a main circuit breaker 160 of the load center 110 may be measured. For example, the sensor 155 may measure current flow in the main supply line 156 that supplies current to the load center 110 from a utility meter 165 coupled to utility power 170. A signal representative of current flow is then provided to a microprocessor of the MLD 150. In the depicted embodiment, the sensor 155 may be a current transformer. The electrical lead of the sensor should be long enough to reach the incoming supply line 156. Other suitable sensors may be used. For example, if power is measured, then both current and voltage information from sensors will be needed.

Figure 2A:
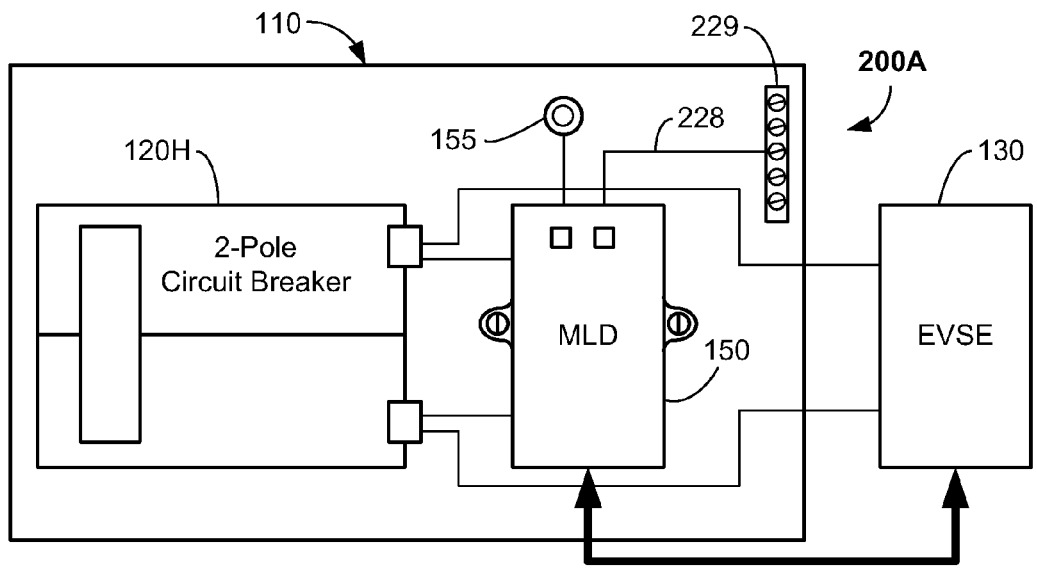
FIGS. 2A-2C illustrate alternative configurations of an electric vehicle charging system according to embodiments.
Figure 2B:
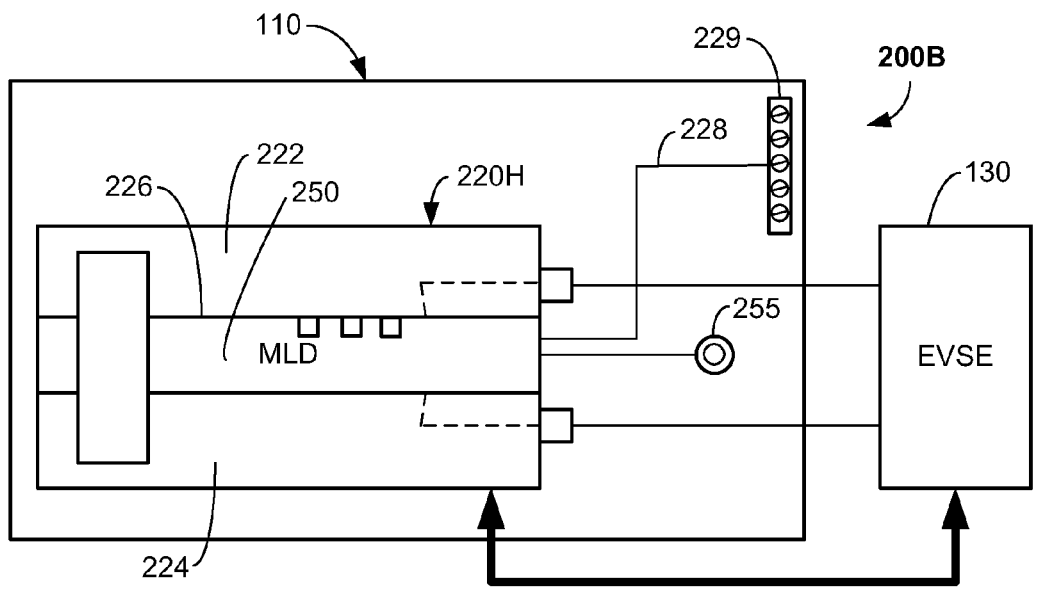
Figure 2C:
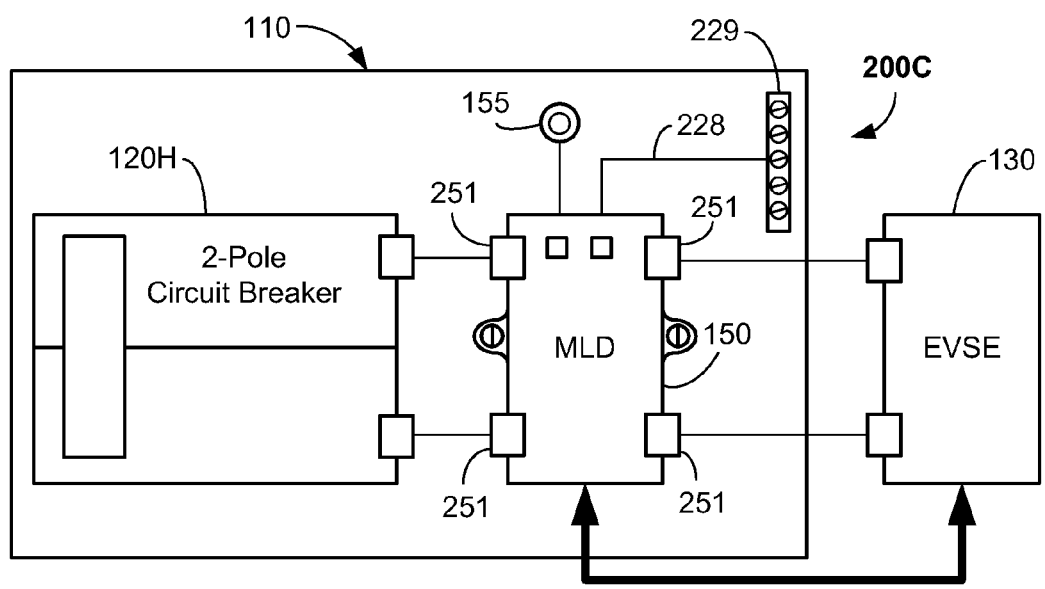

FIGS. 2A-2C illustrate several different embodiments of an electric vehicle charging system 200A-200C. In the electric vehicle charging system 200A of FIG. 2A, the MLD 150 is provided at any suitable location in the load center 110, but is a separate, stand-alone component. For example, the MLD 150 may be mounted to a wall of the housing of the load center 110, such as by suitable fasteners (e.g., screws, rivets, snaps, etc.). The MLD 150 is then wired to receive its power to operate its internal electronics from any one of the circuit breakers, such as circuit breaker 120H. In the depicted embodiment, the EVSE 130 is also electrically coupled to the poles of the circuit breaker 120H to receive power therefrom. The MLD 150 communicates directly (e.g., wirelessly or through a wired communication) with the EVSE 130.

Figure 3:
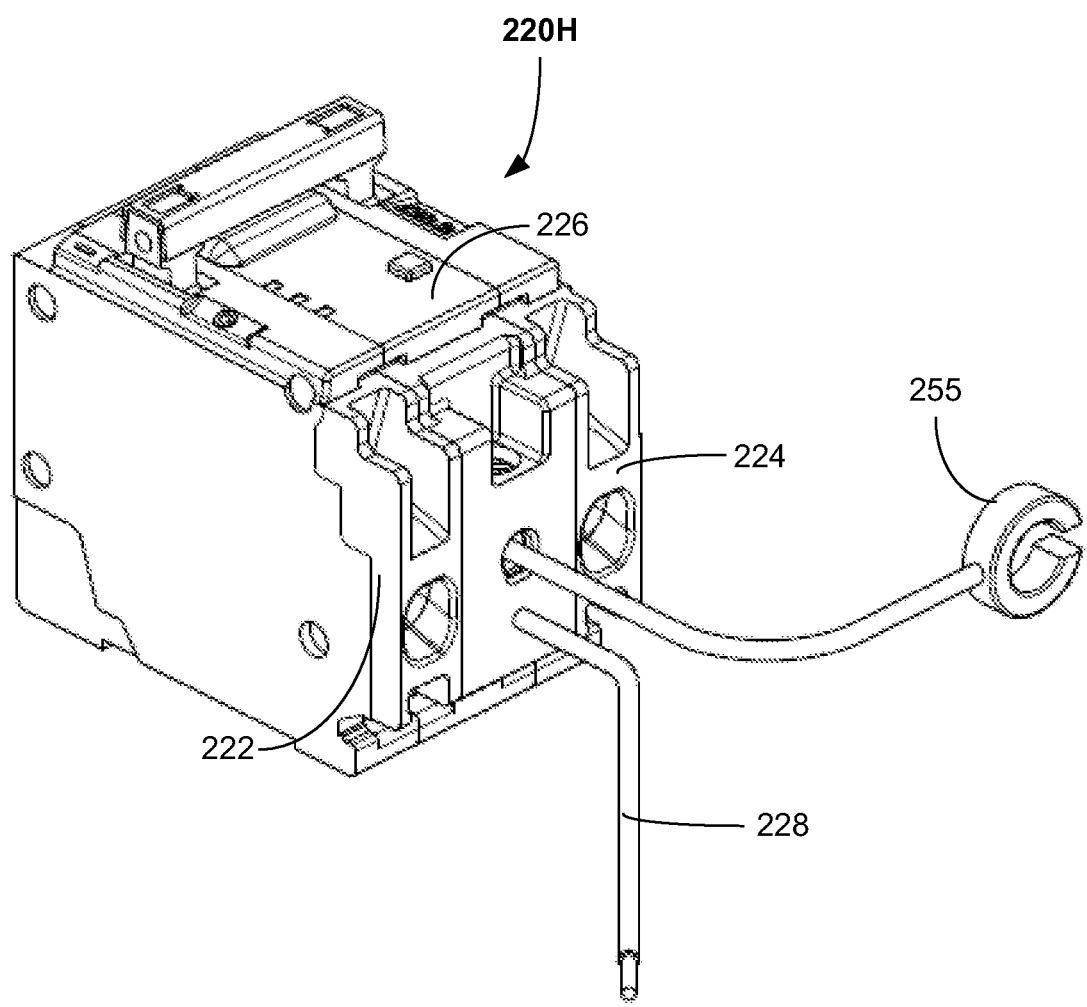
FIG. 3 is an isometric view of a circuit breaker including an integrated MLD according to embodiments.

FIG. 2B illustrates another embodiment of an electric vehicle charging system 200B. In the electric vehicle charging system 200B, the MLD 250 is integrated into a circuit breaker 220H. The components of the MLD 250 are the same as are described herein, but the MLD electronics are integrated onto a center section 226 of the circuit breaker 220H located between the two mechanical poles 222, 224. An example of a circuit breaker 220H including an integrated MLD 250 is shown in FIG. 3. The circuit breaker 220H may include a first mechanical pole 222 and a second mechanical pole 224 and the center section 226 may enclose the electronics of the MLD 250. The sensor 255 is coupled to sensor conditioning of the MLD 250. In each embodiment, a pigtail 228 may be provided, and electrically coupled to a neutral bar 229 of the load center 110. In each embodiment, one or more LED indicators may be provided to provide status information about the MLD 250. For example, one indicator may indicate that the MLD 150 is powered. Another may indicate transmission of a signal to the EVSE 130.

FIG. 2C illustrates another alternative embodiment of an electric vehicle charging system 200B. In this embodiment, the MLD 150 includes terminals 251 that are connected by wires to the circuit breaker 120H and the EVSE 130. Accordingly, the MLD is powered at its terminals 251 and also current passes through the MLD 150 to the EVSE 130.

Figure 4:
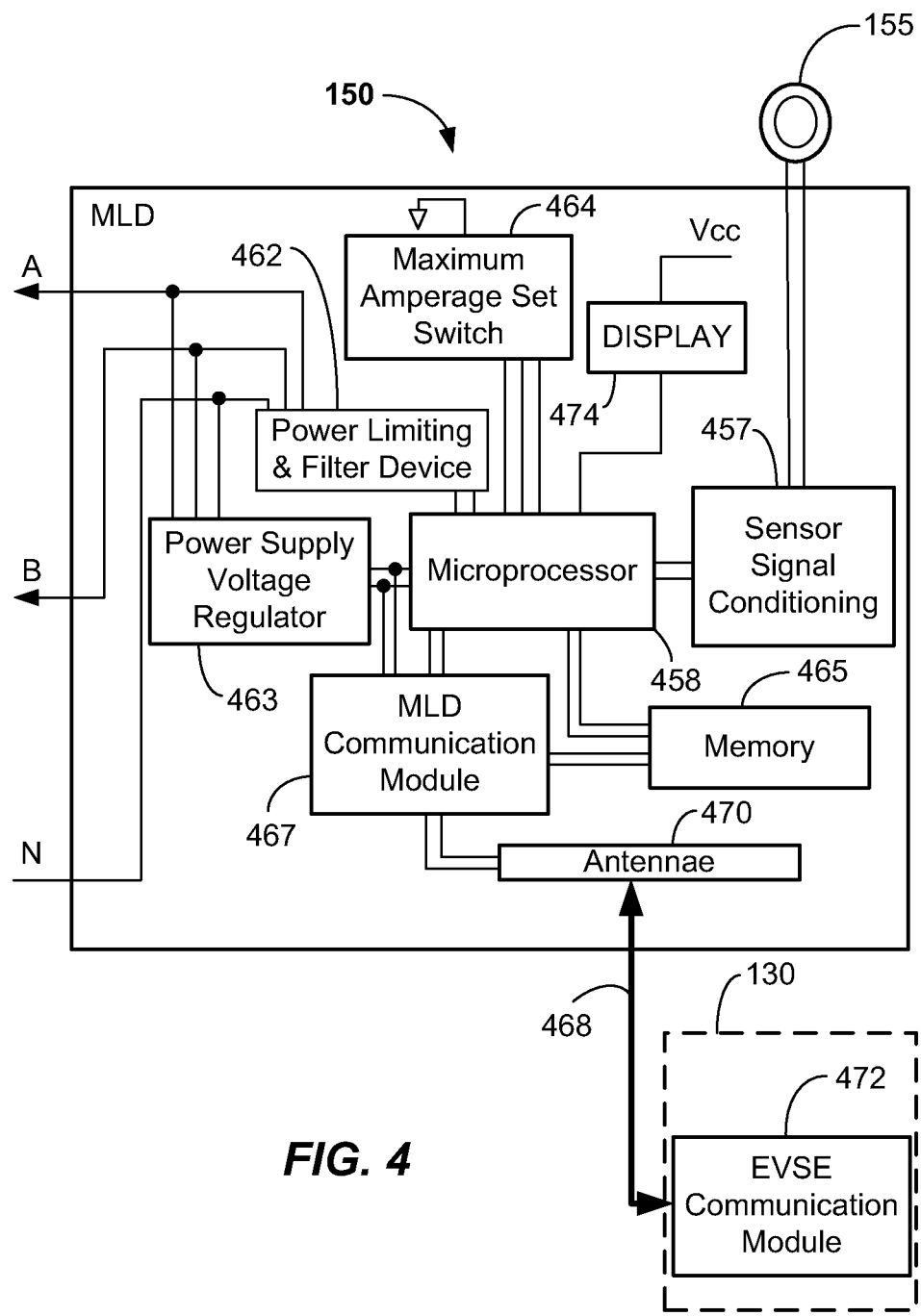
FIG. 4 illustrates a block diagram of a monitoring and limiting device (MLD) according to embodiments.

FIG. 4 illustrates an example embodiment of a MLD 150. The MLD 150 includes a sensor 155, such as a current transformer sensor adapted to sense electrical current. Sensor signal conditioning 457 receives a sensor signal from the current transformer sensor 155 that is indicative of current flow in the sensed path (e.g., main utility line to the load center 110) and appropriately conditions that signal, such as by amplifying and converting the raw signal (e.g., via an A/D converter) to a digital signal that is useable by the microprocessor 458. The microprocessor 458 may be any suitable processor such as a Teridian 78M6612, available from Teridian Semiconductor Corp. The microprocessor 458 may have its own internal flash and/or Random Access Memory (RAM) memory. Other microprocessors adapted to process signal inputs and perform metrology functions may be used.

The MLD 150 may be designed to receive 240 VAC directly from the circuit breaker it is connected to, for example. For example, in one embodiment, power may be provided by connections to the circuit breaker (e.g., 120H) via A-phase (A), B-phase (B) and neutral (N) connections in the case of a non-integrated version, and by connection to the stabs when the MLD 250 is integrated into the circuit breaker, such as in circuit breaker 220H of FIG. 2B and FIG. 3. Power for the MLD 150 includes power conditioning, which may include power limiting and filtering by a power limiting & filter device 462, as well as voltage regulation by a power supply voltage regulator 463. Any suitable power conditioning may be used. Coupled to an I/O pin of the microprocessor 458 is a maximum amperage set switch 464 adapted to set and communicate to the microprocessor 458 a maximum amperage setting of the load center 110. For example, the maximum amperage setting switch 464 may set the amperage between values of 60 A, 100, 125, and 200 amps, for example. Other amperage values may be used. A rotary dial switch may be used. The maximum amperage set switch 464 functions to change a constant value to which the current sensed by the sensor 155 is compared, as will be described further herein. A suitable external memory 465, such as a 64 K-bit SMT F-RAM memory may be used. For example, a DFN-8 memory model FM24CL from RAMTRON may be provided to store the maximum amperage setting value, and sensed current values received by the microcontroller 458 from the sensor signal conditioning 457 as well as other information.

Based upon the sensed current values indicative of how much current is being drawn by the one or more loads 115A-115G and 115I-115N and by the EVSE 130, the microcontroller 458 can calculate a desired charge current output setting for the EVSE 130. The current charge output setting is preferably set so that the main breaker 160 will not experience and overload situation and trip given the overall load drawn by the electrical loads 115A-115N coupled to the load center 110. A signal (e.g., a wired or wireless signal) is sent directly to the EVSE 130 that is representative of the charge current setting. Communication may be by any suitable wireless communication method via MLD communication module 467 coupled to the microprocessor 458. In particular, the communication may be carried out by the communication module 467 sending a radio frequency (RF) signal 468 by way of suitable antennae 470. The communication module 467 may be a ZIGBEE System On Chip (SoC), such as an EMBER EM357 available from EMBER CORPORATION, for example. Other suitable communication chips may be used. The EM357 combines a 2.4 GHz IEEE 802.15.4 radio transceiver with a 32-bit microprocessor, flash memory, and random access memory (RAM). The wireless signal 468 is received by an EVSE communication module 472 of the EVSE 130. The wireless signal 468 is utilized by the EVSE 130 to set a maximum charge current output setting of the EVSE 130. This maximum charge current output setting is communicated to the EV 145 which then sets the current draw. A display 474, such as one or more LEDs may be used to signal power, state, and/or error condition. The various electronic components of the MLD 150 may be mounted on a circuit board which may be received in a suitable plastic molded housing or the center section 226 in the case where the MLD 250 is integrated into a circuit breaker 220H. The electronic components of the MLD 250 are identical to those described herein.

Figure 5:
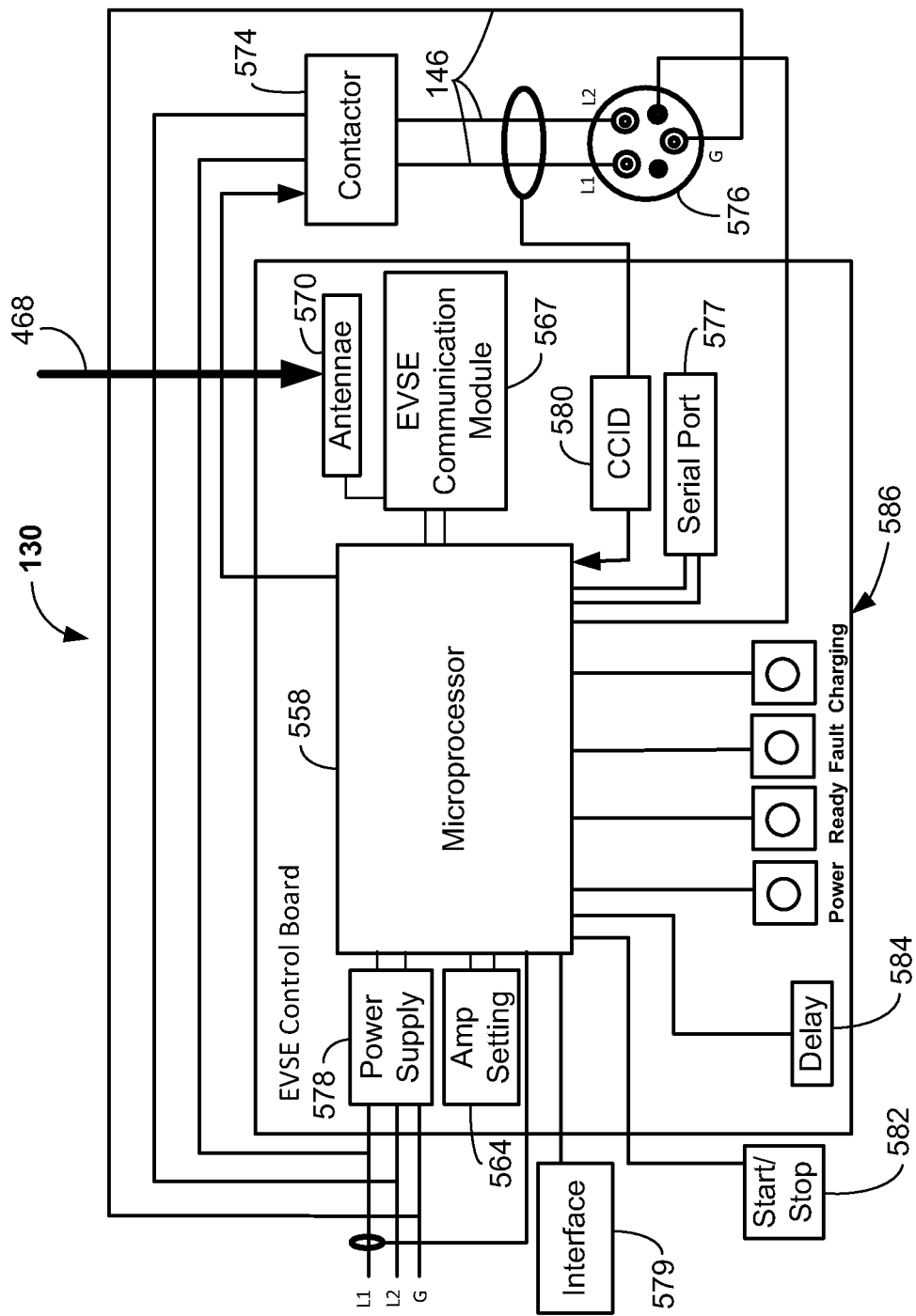
FIG. 5 is an electrical block diagram of an Electric Vehicle Service Equipment (EVSE) according to embodiments.

FIG. 5 illustrates an exemplary embodiment of an EVSE 130 including a communication module 567 adapted to wirelessly and directly communicate with the communication module 467 of the MLD 150 (FIG. 4). For example, the communication module 467 may be a ZIGBEE SoC as described above. However, it should be recognized that the communication modules the EVSE 130 and MLD 150 may be a PLCs if the communication is wired. As in the MLD embodiment, the EVSE 130 may also include an amperage setting switch 564 that functions to further limit the maximum amperage that the EV 145 can request from the bad center 110. This amperage setting switch 564 functions to limit current even in the case where other loads are not present in the residence. The antennae 570 connected to the communication module 567 is adapted to receive the wireless signal 468 from the communication module 467. The received signal 468 is indicative of a maximum charge output setting for the EVSE 130. The microprocessor 558 then sets a maximum amperage output for the ESVE 130 by communicating this maximum amperage setting to the EVSE 130 via industry standard protocol SAE J1772. A contactor 574 is connected to charge cable 146, which terminates at the EVSE connector 576. The EVSE connector 576 may be a SAE J1772 connector and is adapted to couple to a receiving connector on the EV 145 (FIG. 1). The ESVE 130 may further include a serial port 577, such as a differential serial port RS485 for data communication, suitable power supply and conditioning 578, a user interface 579 for user input to the EVSE 130, a Circuit Card Interface Device (CCID) 580 to provide feedback information about the level of charge, a start/stop button 582, a delay 584 to enable delayed charging for an amount of delay time, and other indicators 586 adapted to indicate whether the EVSE 130 is powered, ready, in a fault condition, or is charging.

Figure 6:
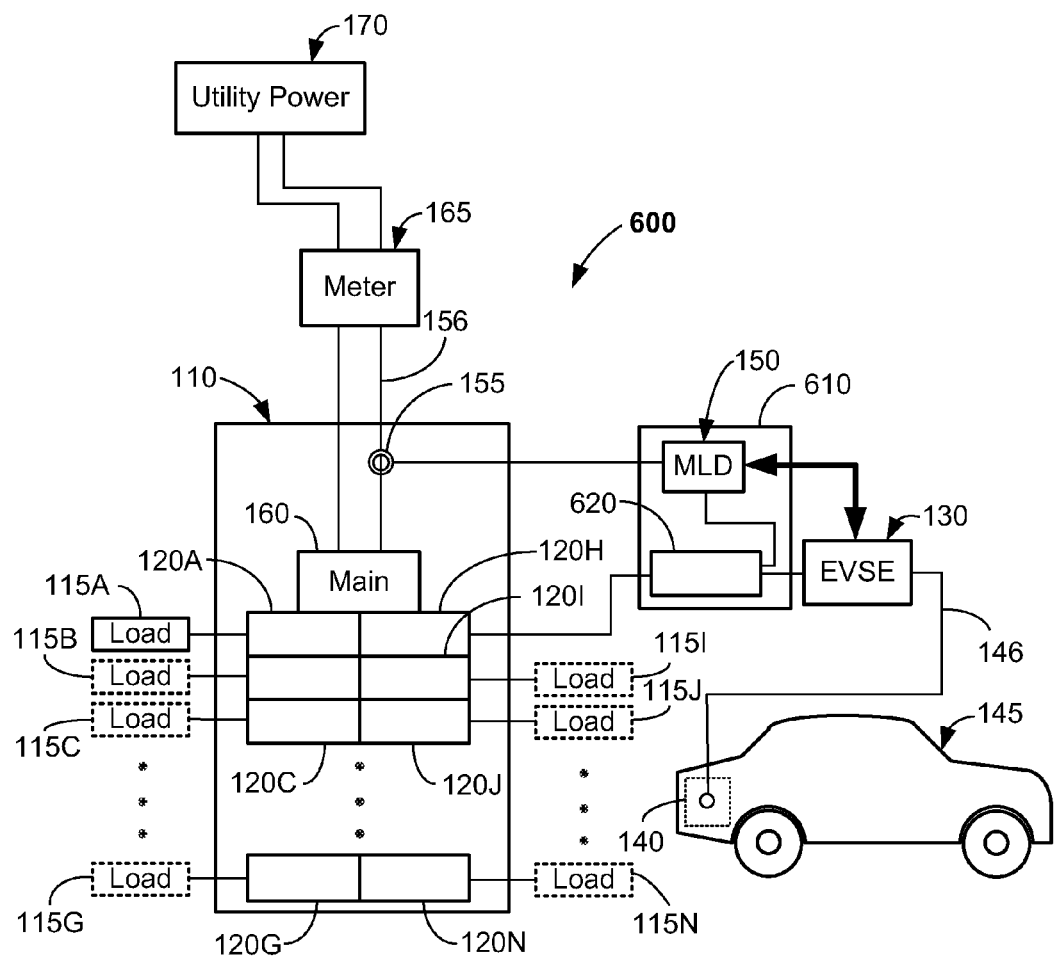
FIG. 6 illustrates a block diagram of an alternate configuration of an electric vehicle charging system according to embodiments.

Optionally, the electric vehicle charging system 600, as shown in FIG. 6, may include a subpanel 610, and the EVSE 130 may be wired to a circuit breaker 620 of the subpanel (FIG. 6) that is electrically coupled to the load center 110. The MLD 150 may reside in the subpanel 610 outside of the load center 110. The sensor 155 may, however, still sense current and/or power provided to the main load center, and adjust the charge setting to the EVSE 130 as discussed herein. The remainder of the system 600 is as described with reference to FIGS. 1, 4 and 5.

Figure 7:
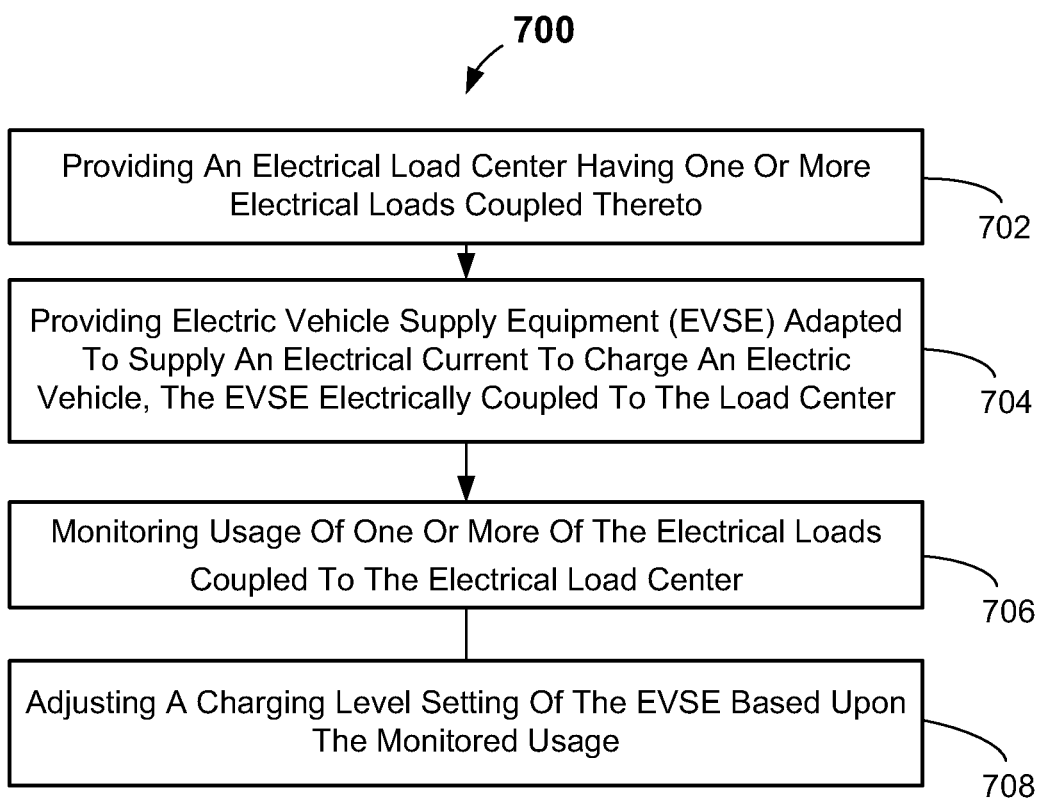
FIG. 7 is a flowchart of a method of operation of an electric vehicle charging system according to embodiments.

A method of the invention will now be described with reference to FIG. 7. The method 700 of charging a vehicle (e.g., EV 145) with electric vehicle supply equipment (e.g., EVSE 130) includes, in 702, providing an electrical load center (e.g., load center 110) having one or more electrical branch circuits having electrical loads (e.g., loads 115A-115N) electrically coupled thereto. In 704, an electric vehicle supply equipment (e.g., EVSE 130) is provided that is adapted to supply an electrical current to charge an electric vehicle (e.g., EV 145), wherein the EVSE is also electrically coupled to the load center (e.g., load center 110) and also comprises a load thereof. In 706, current usage of one or more of the electrical loads (115A-115N and including the EVSE 130) coupled to the electrical load center is monitored. The monitoring may be by the use of a suitable sensor, such as the current transformer sensor 155 described herein. The current transformer sensor 155 may measure the current flowing in the utility line (e.g., line 156) powering the load center 110 and send a signal 468 (e.g., a wireless or wired PLC signal) to increase or decrease the charge current output setting Ac based upon preset criteria. For example, it may be desired that the total current drawn by all the loads not exceed a preset threshold (e.g., 80% of the maximum amperage setting (Amax) dialed on the maximum amperage set switch 464). Optionally, the sensor 155 may monitor only one or more of the loads 115A-115N that is expected to draw the greatest current (for example, only the water heater and air conditioner), and the charge current output (Ac) of the EVSE 130 may be set based upon the setting of the maximum amperage setting (Amax) and the monitored current (Am) from the one or more loads. For example, the charging level output setting (Ac) that may be set may be determined as follows:

$$Ac = C(A\max - Am) \qquad \text{Eqn. 1}$$

where C is a constant that is set based upon experience (e.g., 0.8). The constant value C may be set to allow some load to be used by the other non-monitored branches (e.g., lights).

However, in a preferred embodiment, the current supplied in the main utility line (e.g., line 156) is monitored and the charge current output setting (Ac) is set for the EVSE 130 based upon the maximum amperage setting (Amax) dialed on the maximum amperage set switch 464 and the monitored current (Am). For example, if the monitored current (Am) equals a preset percentage (e.g., 80%) of the maximum amperage setting (Amax), then the charging current output setting (Ac) of the EVSE 130 will be decreased so that the preset percentage is not exceeded. The preset percentage may be set based upon experience with the current draw on startup of the various branch electrical loads. The signal 468 is sent directly to the EVSE 130 from the MLD 150 and may be a signal that simply says to decrease the charging level output setting (Ac) of the EVSE 130, or may be a signal that indicates the actual charging output (Ac) to output. In another example, if the MLD 250 were to include a separate current sensor to periodically monitor the current (Ab) provided to the EVSE 130, i.e., the current through the circuit breaker 220H that the EVSE 130 is coupled to, then the setting Ac may be set based upon the following relationship:

$$Ac = C(A\max) - (Am - Ab)$$

Of course this is iterative and can be sampled at any suitable sampling rate to ensure relatively gradual increases in charging current output setting (Ac). Controlling the charging current output setting (Ac) of the EVSE 130 will minimize instances where the main breaker 160 may be tripped based upon the EVSE 130 drawing too much current. Normally, the charging level setting (Ac) will be set to the maximum output of the EVSE 130. This may be determined based upon the maximum output rating of the contactor 574 (FIG. 5). However, in 708, the charging level (Ac) of the EVSE 130 will be adjusted downward based upon a monitored value of current (Am) utilized by the one or more loads. Thus, the method 700 may operate to prevent the EVSE 130 from drawing too much current in light of the current drawn by the other electrical loads (e.g., 115A-115N) in other branches coupled to the load center 110. Advantageously, the problem of main circuit breaker tripping encountered in the prior art is improved.

It should be readily appreciated by those persons skilled in the art that the present invention is susceptible of broad utility and application. Many embodiments and adaptations of the present invention other than those herein described, as well as many variations, modifications, and equivalent arrangements, will be apparent from, or reasonably suggested by, the present invention and the foregoing description thereof, without departing from the substance or scope of the present invention. Accordingly, while the present invention has been described herein in detail in relation to specific embodiments, it is to be understood that this disclosure is only illustrative and presents examples of the present invention and is made merely for purposes of providing a full and enabling disclosure of the invention. This disclosure is not intended to limit the invention to the particular systems or methods disclosed, but, to the contrary, the intention is to cover all modifications, equivalents, and alternatives falling within the spirit and scope of the invention.

What is claimed is:

1. An electric vehicle charging monitoring and limiting device, comprising:
a monitoring and limiting device (MLD) adapted to monitor power or current usage of one or more electrical loads coupled to a load center, each electrical load protected by its own circuit breaker, and send a signal to adjust a charging level setting of electric vehicle supply equipment (EVSE) based upon a level of the usage, the MLD configured to receive power via one of the circuit breakers protecting one of the electrical loads.

2. The monitoring and limiting device of claim 1, comprising a sensor adapted to monitor an electric current supplied to one or more electrical loads coupled to the load center.

3. The monitoring and limiting device of claim 1, comprising a communication module adapted to wirelessly communicate directly with the EVSE.

4. The monitoring and limiting device of claim 1, comprising a maximum amperage set switch operable to set a maximum amperage rating corresponding to the load center.

5. The monitoring and limiting device of claim 1, wherein the MLD is integral with a circuit breaker mounted in the load center.

6. The monitoring and limiting device of claim 1, comprising a microcontroller adapted to compare a monitored current value to a threshold current value and adjust a charging level setting of the EVSE if the monitored current value exceeds the threshold current value.

7. An electric vehicle charging system, comprising:
a load center having one or more electrical loads coupled thereto, each electrical load protected by its own circuit breaker of the load center;
electric vehicle supply equipment (EVSE) adapted to supply an electrical current to charge an electric vehicle (EV); and a monitoring and limiting device (MLD) adapted to monitor power or current usage of the one or more loads coupled to the load center, and adjust a charging level setting of the EVSE based upon a level of the usage, the MLD coupled to receive power via one of the circuit breakers protecting one of the electrical loads.

8. The electric vehicle charging system of claim 7, wherein the charging level setting of the EVSE is decreased based upon a monitored current (Am) flowing to the one or more loads and a maximum amperage set switch setting.

9. The electric vehicle charging system of claim 8, wherein the charging level setting (Ac) of the EVSE is set according to the relationship:

$$Ac=C(A\max-Am)$$

Wherein Amax is a setting of a maximum amperage set switch, Am is a monitored current flowing to the one or more loads, and C is a constant.

10. The electric vehicle charging system of claim 7, wherein the MLD comprises at least one sensor adapted to measure a current flow.

11. The electric vehicle charging system of claim 7, wherein the MLD comprises a communication module adapted to wirelessly communicate directly with the EVSE.

12. The electric vehicle charging system of claim 11, wherein the communication module communicates with the EVSE based on an IEEE (Institute of Electrical and Electronics Engineers) 802 standard.

13. The electric vehicle charging system of claim 7, wherein the MLD comprises a maximum amperage set switch operable to set a maximum amperage rating corresponding to the load center.

14. The electric vehicle charging system of claim 7, wherein the maximum amperage rating is greater than or equal to 60 A and less than or equal to 400 A.

15. The electric vehicle charging system of claim 7, comprising at least one sensor coupled to incoming utility line of the load center.

16. The electric vehicle charging system of claim 7, wherein the MLD is integral with a circuit breaker mounted in the load center.

17. The electric vehicle charging system of claim 7, wherein the MLD is located outside of the load center.

18. The electric vehicle charging system of claim 7, wherein the MLD comprises a microcontroller adapted to compare a monitored current value to a threshold current value and adjust a charging level setting of the EVSE if the monitored current value exceeds the threshold current value.

19. An electric vehicle charging system, comprising:
a load center adapted and configured to have one or more electrical loads coupled thereto, each electrical load protected by its own circuit breaker of the load center; and
a monitoring and limiting device (MLD) adapted to monitor current usage of at least one of the one or more electrical loads coupled to the load center, the MLD adapted to communicate with electric vehicle supply equipment (EVSE) and coupled to receive power via one of the circuit breakers protecting one of the electrical loads, the MLD further including
a maximum amperage set switch operable to set a maximum amperage rating corresponding to the load center, and
an MLD communication module adapted to send a signal to adjust a charging level setting of the EVSE based upon the monitored current usage.

20. A circuit breaker, comprising:
at least two mechanical poles; and
a monitoring and limiting device (MLD) adapted to monitor power or current usage of the one or more electrical loads coupled to a load center, and send a signal to adjust a charging level setting of electric vehicle supply equipment (EVSE) based upon a level of the usage, wherein the MLD is integrated between the two mechanical poles.

21. A method of charging a vehicle with electric vehicle supply equipment, comprising:
providing an electrical load center having one or more electrical loads coupled thereto, each electrical load protected by its own circuit breaker of the load center;
providing electric vehicle supply equipment (EVSE) adapted to supply an electrical current to charge an electric vehicle, the EVSE electrically coupled to the load center;
monitoring usage of one or more of the electrical loads coupled to the electrical load center;
powering the monitoring via one of the circuit breakers protecting one of the electrical loads; and
adjusting a charging level setting of the EVSE based on the monitored usage.

* * * * *